(12) United States Patent
van Diggelen et al.

(10) Patent No.: US 8,090,536 B2
(45) Date of Patent: Jan. 3, 2012

(54) METHOD AND APPARATUS FOR COMPRESSION OF LONG TERM ORBIT DATA

(75) Inventors: Frank van Diggelen, San Jose, CA (US); Matt Riben, Cupertino, CA (US); Sergei Podshivalov, San Jose, CA (US); Charles Abraham, Los Gatos, CA (US); Javier De Salas, Madrid (ES)

(73) Assignee: Broadcom Corporation, Irvine, CA (US)

(*) Notice: Subject to any disclaimer, the term of this patent is extended or adjusted under 35 U.S.C. 154(b) by 1225 days.

(21) Appl. No.: 11/724,627

(22) Filed: Mar. 15, 2007

(65) Prior Publication Data

US 2007/0282910 A1  Dec. 6, 2007

Related U.S. Application Data

(63) Continuation-in-part of application No. 11/333,787, filed on Jan. 17, 2006, now Pat. No. 7,443,340, which is a continuation-in-part of application No. 09/993,335, filed on Nov. 6, 2001, now Pat. No. 7,053,824, which is a continuation-in-part of application No. 09/884,874, filed on Jun. 19, 2001, now Pat. No. 6,560,534, which is a continuation-in-part of application No. 09/875,809, filed on Jun. 6, 2001, now Pat. No. 6,542,820.

(51) Int. Cl.
*G01S 5/14* (2006.01)
*H04B 7/185* (2006.01)
*G06F 19/00* (2006.01)

(52) U.S. Cl. ........... 701/226; 701/200; 342/357.06; 707/104.1

(58) Field of Classification Search ........... 701/226, 701/200; 342/357.06, 357.15; 707/104.1; 455/427
See application file for complete search history.

(56) References Cited

U.S. PATENT DOCUMENTS

| | | | |
|---|---|---|---|
| 4,894,662 A | 1/1990 | Counselman | |
| 5,365,450 A | 11/1994 | Schuchman et al. | |
| 5,417,217 A | 5/1995 | Morita et al. | |
| 5,430,657 A * | 7/1995 | Kyrtsos | 701/226 |
| 5,506,781 A | 4/1996 | Cummiskey et al. | |
| 5,673,256 A | 9/1997 | Maine | |
| 5,726,893 A | 3/1998 | Schuchman et al. | |
| 5,828,336 A * | 10/1998 | Yunck et al. | 342/357.31 |
| 5,841,396 A | 11/1998 | Krasner | |
| 5,862,495 A * | 1/1999 | Small et al. | 701/13 |

(Continued)

FOREIGN PATENT DOCUMENTS

EP  1197761 A  4/2002

(Continued)

OTHER PUBLICATIONS

PCT International Preliminary Report on Patentability mailed Jun. 1, 2006 for PCT Application No. PCT/US04/39367.

(Continued)

*Primary Examiner* — Tan Q Nguyen

(74) *Attorney, Agent, or Firm* — McAndrews, Held & Malloy, Ltd.

(57) ABSTRACT

A method and apparatus for processing long term orbit data that is valid for an extended period of time into the future (i.e., long term orbit data). The long term orbit data is processed by reducing redundant information from the data to form compressed long term orbit data.

38 Claims, 8 Drawing Sheets

U.S. PATENT DOCUMENTS

| | | | |
|---|---|---|---|
| 5,938,721 A | | 8/1999 | Dussell et al. |
| 5,963,167 A | | 10/1999 | Lichten et al. |
| 5,983,109 A | | 11/1999 | Montoya |
| 6,064,336 A | | 5/2000 | Krasner |
| 6,085,128 A | * | 7/2000 | Middour et al. ............... 701/13 |
| 6,107,960 A | * | 8/2000 | Krasner ................ 342/357.59 |
| 6,133,874 A | * | 10/2000 | Krasner ................ 342/357.15 |
| 6,134,483 A | | 10/2000 | Vayanos et al. |
| 6,211,819 B1 | * | 4/2001 | King et al. ............. 342/357.66 |
| 6,256,475 B1 | | 7/2001 | Vannucci |
| 6,272,316 B1 | | 8/2001 | Wiedeman et al. |
| 6,313,787 B1 | * | 11/2001 | King et al. ............. 342/357.42 |
| 6,411,892 B1 | | 6/2002 | van Diggelen |
| 6,411,899 B2 | | 6/2002 | Dussell et al. |
| 6,429,811 B1 | * | 8/2002 | Zhao et al. ............. 342/357.66 |
| 6,453,237 B1 | | 9/2002 | Fuchs et al. |
| 6,542,820 B2 | | 4/2003 | LaMance et al. |
| 6,642,884 B2 | | 11/2003 | Bryant et al. |
| 6,725,012 B1 | * | 4/2004 | Janson et al. ............. 455/12.1 |
| 6,725,159 B2 | | 4/2004 | Krasner |
| 6,813,560 B2 | | 11/2004 | van Diggelen et al. |
| 6,856,282 B2 | | 2/2005 | Mauro et al. |
| 7,679,550 B2 | * | 3/2010 | Garrison et al. ......... 342/357.29 |
| 2002/0032526 A1 | | 3/2002 | van Diggelen |
| 2002/0049536 A1 | | 4/2002 | Gaal |
| 2002/0198657 A1 | | 12/2002 | Robbins |
| 2003/0212821 A1 | | 11/2003 | Gillies et al. |
| 2003/0223422 A1 | | 12/2003 | Igarashi et al. |
| 2004/0203853 A1 | | 10/2004 | Sheynblat |
| 2005/0003833 A1 | | 1/2005 | Younis |
| 2006/0105708 A1 | * | 5/2006 | Maeda et al. ................ 455/12.1 |
| 2007/0103364 A1 | * | 5/2007 | Garin et al. ............. 342/357.15 |

FOREIGN PATENT DOCUMENTS

| | | |
|---|---|---|
| WO | WO-02/103383 | 12/2002 |

OTHER PUBLICATIONS

*International Search Report* mailed Mar. 17, 2004 for PCT Application No. PCT/US03/30872.
*International Search Report* mailed Dec. 23, 2005 for PCT Application No. PCT/US04/39367.
*International Search Report* mailed May 15, 2006 for PCT Application No. PCT/US06/04422.
*PCT Written Opinion* mailed Dec. 23, 2005 for PCT Application No. PCT/US04/39367.
*PCT Written Opinion* mailed May 15, 2006 for PCT Application No. PCT/US06/04422.
Van Diggelen, Frank, "Global Locate Indoor GPS Chipset & Services", *JON GPS 2001*, Sep. 11-14, 2001, Salt Lake City, UT, USA, (Online) Sep. 11, 2001, pp. 1515-1521, XP002358532 Retrieved from the Internet: URL: http://ww.ion.org/:: (retrieved on Sep. 12, 2005).

* cited by examiner

| OTD FOR SATELLITE PRN 1, WEEK 1115 | | | | |
|---|---|---|---|---|
| TIME OF WEEK (SECONDS) | SATELLITE POSITION X (METERS) | SATELLITE POSITION Y (METERS) | SATELLITE POSITION Z (METERS) | SATELLITE CLOCK OFFSET (SECONDS) |
| 560400.0 | 151210924.3 | -6269504.8 | -20691762.4 | 0.000179304909 |
| 560460.0 | 153332252.6 | -6166907.8 | -20632874.0 | 0.000179304908 |
| 560520.0 | 154555578.4 | -6065020.3 | -205722383.0 | 0.000179304908 |
| 560580.0 | 155777888.4 | -5963848.4 | -205510294.2 | 0.000179304907 |
| 560640.0 | 15700169.1 | -5863397.7 | -20446612.6 | 0.000179304907 |

FIG. 6

METHOD AND APPARATUS FOR COMPRESSION OF LONG TERM ORBIT DATA

CROSS-REFERENCE TO RELATED APPLICATIONS

This application is a continuation-in-part application of U.S. patent application Ser. No. 11/333,787 filed Jan. 17, 2006, now U.S. Pat. No. 7,443,340 which is a continuation-in-part application of U.S. patent application Ser. No. 09/993,335, filed Nov. 6, 2001, now U.S. Pat. No. 7,053,824 which is a continuation-in-part of U.S. patent application Ser. No. 09/884,874, filed Jun. 19, 2001, now U.S. Pat. No. 6,560,534, which is a continuation-in-part of U.S. patent application Ser. No. 09/875,809, filed Jun. 6, 2001, now U.S. Pat. No. 6,542,820. This application contains subject matter that is related to U.S. patent application Ser. No. 09/715,860, filed Nov. 17, 2000, now U.S. Pat. No. 6,417,801. Each of the aforementioned related patents and/or patent applications is herein incorporated by reference.

BACKGROUND OF THE INVENTION

1. Field of the Invention

The present invention generally relates to generating satellite orbit information for earth orbiting satellites. More specifically, the invention relates to a method and apparatus for compressing long term orbit information (also known as "extended ephemeris" information) prior to distributing the information through a network or communications link.

2. Description of the Related Art

A positioning receiver for a Global Navigation Satellite System (GNSS), such as the Global Positioning System (GPS), uses measurements from several satellites to compute a position. The process of acquiring the GNSS radio signal is enhanced in speed and sensitivity if the GNSS receiver has prior access to a model of the satellite orbit and clock. This model is broadcast by the GNSS satellites and is known as an ephemeris or ephemeris information. Each satellite broadcasts its own ephemeris once every 30 seconds. Once the GNSS radio signal has been acquired, the process of computing position requires the use of the ephemeris information.

The broadcast ephemeris information is encoded in a 900 bit message within the GNSS satellite signal. It is transmitted at a rate of 50 bits per second, taking 18 seconds in all for a complete ephemeris transmission. The broadcast ephemeris information is typically valid for 2 to 4 hours into the future (from the time of broadcast). Before the end of the period of validity the GNSS receiver must obtain a fresh broadcast ephemeris to continue operating correctly and produce an accurate position. It is always slow (no faster than 18 seconds), frequently difficult, and sometimes impossible (in environments with very low signal strengths), for a GNSS receiver to download an ephemeris from a satellite. For these reasons it has long been known that it is advantageous to send the ephemeris to a GNSS receiver by some other means in lieu of awaiting the transmission from the satellite. Previously available systems use a technique that collects ephemeris information at a GNSS reference station, and transmits the ephemeris to the remote GNSS receiver via a wireless transmission. This technique of providing the ephemeris, or equivalent data, to a GNSS receiver has become known as "Assisted-GNSS". Since the source of ephemeris in Assisted-GNSS is the satellite signal, the ephemeris information remains valid for only a few hours. As such, the remote GNSS receiver must periodically connect to a source of ephemeris information whether that information is received directly from the satellite or from a wireless transmission. Without such a periodic update, the remote GNSS receiver will not accurately determine position.

Until recently, the deficiency of the current art was that there was no source of satellite trajectory and clock information that is valid for longer than a few hours into the future, and it can be expensive to send the ephemeris information repeatedly to the many remote devices that may need it. Moreover, mobile devices may be out of contact from the source of the Assisted-GNSS information when their current ephemeris becomes invalid. Consequently, long term orbit models (sometimes referred to as extended ephemeris) are used to enable an assisted-GNSS receiver to operate for a long period of time before new ephemeris is required. However, long term orbit models that extend over a long period of time can contain many bits that form large files. These large files utilize extensive bandwidth when being transmitted through a network to a GNSS receiver.

Therefore, there is a need in the art for a method and apparatus for providing satellite trajectory and clock information that is valid for an extended period into the future, e.g., many days into the future, and sending that information to a GNSS receiver in a compressed form.

SUMMARY OF THE INVENTION

The present invention is a method and apparatus for generating satellite orbit data that is valid for extend periods of time into the future, i.e., long term orbits or LTO (also referred to as extended ephemeris) and compressing the LTO before transmission to a GNSS receiver. The LTO may contain future satellite trajectory information and/or satellite clock information. The LTO is derived by receiving at one or more satellite tracking stations the signals from at least one satellite and determining satellite tracking information (STI) from the received signals. STI contains present satellite orbit trajectory data and satellite clock information (e.g., ephemeris). The LTO is created for each satellite, as identified by its unique pseudo-random noise (PRN) code. LTO is often formatted as sequential blocks of data, each block valid for a period of time. Some of the data fields change little or not at all from block to block, and other data fields can be predicted from other data. Thus some of the data in the LTO may be described as redundant information. To compress the LTO, redundancy is reduced amongst the individual LTO associated with each satellite. In this manner, a data set containing a set of LTO for a plurality of satellites is substantially smaller than the uncompressed set of LTO for the same plurality of satellites.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 depicts an example of a data table that could be used in an LTO database;

DETAILED DESCRIPTION OF THE PREFERRED EMBODIMENT

Figure 1:
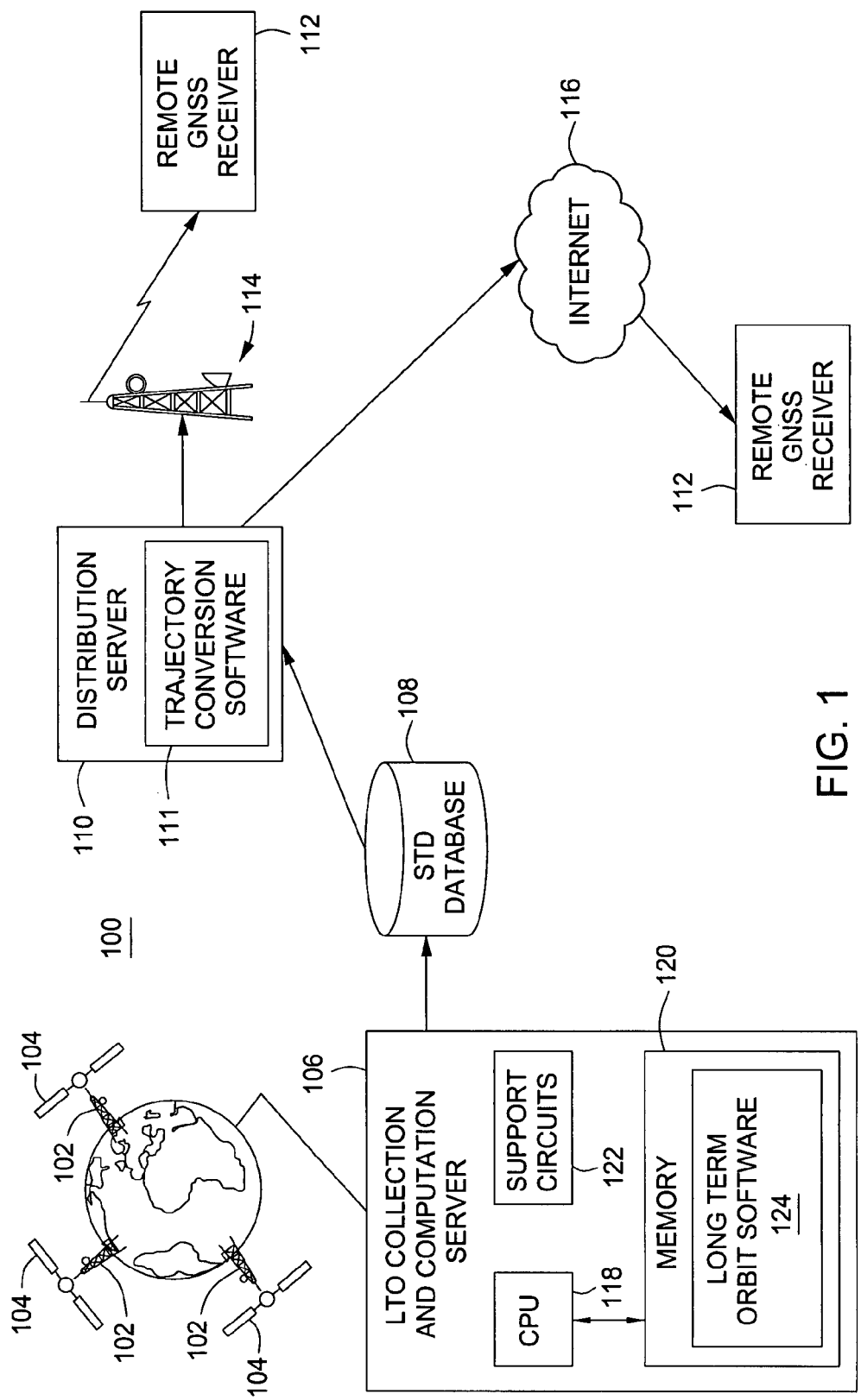
FIG. 1 depicts a system for creating and distributing long term satellite tracking data (LTO) to remote GNSS receivers.

FIG. 1 depicts a block diagram of a system 100 for creating and distributing long term satellite tracking data (LTO). The global navigation satellite system (GNSS) may include the global positioning system (GPS), GLONASS, GALILEO, or other satellite systems that may use LTO to enhance the performance of the receiver. The following disclosure uses GPS as an illustrative system within which the invention operates. From the following disclosure, those skilled in the art will be able to practice the invention in conjunction with other satellite systems.

A network of GNSS tracking stations 102 is used to collect measurement data from the GNSS satellites 104. Such a network is described in detail in U.S. patent application Ser. No. 09/615,105, filed Jul. 13, 2000. The network could comprise several tracking stations that collect satellite tracking information (STI) from all the satellites in the constellation, or a few tracking stations, or a single tracking station that only collects STI for a particular region of the world. An LTO collection and computation server 106 collects and processes the measurement data (this measurement data is referred to herein as satellite tracking information (STI) that includes at least one of: code phase measurements, carrier phase measurements, Doppler measurements, or ephemeris data). In the preferred embodiment, measurement data is obtained from both the L1 and L2 frequencies on which the GPS satellites transmit. Alternative embodiments may use only one of these frequencies, and/or other frequencies used by other satellite systems or by future versions of the GNSS system. The server 106 produces: 1) accurate satellite tracking data (STD) (e.g., a trajectory of each satellite and/or a clock offset measurement) during the data collection period, 2) a prediction of the future STD of each satellite, and 3) models that match the future STD of each satellite to form an LTO for each satellite. The server 106 comprises a central processing unit (CPU) 118, support circuits 122, and memory 120. The CPU 118 may be any one of the many CPUs available on the market to perform general computing. Alternatively, the CPU may be a specific purpose processor such as an application specific integrated circuit (ASIC) that is designed to process satellite tracking information. The support circuits 122 are well known circuits such as clock circuits, cache, power supplies and the like. The memory 120 may be read only memory, random access memory, disk drive storage, removable storage or any combination thereof. The memory 120 stores executable software, e.g., LTO software 124, that, when executed by the CPU 118, causes the system 100 to operate in accordance with the present invention.

The set of satellite trajectory and clock data produced by the LTO software 124 constitutes the STD information, and is stored in an STD database 108. A distribution server 110 accesses the database 108 to gather the most recent set of data, formats the data using the trajectory conversion software 111 according to the relevant interface standard, and distributes the formatted data to GNSS devices 112 that require satellite orbit information. The distribution process may be by some form of wireless communications system 114, or over the Internet 116, or a combination of both, or by some other means of communication. Once the GNSS devices 112 have received the orbit data, they may operate continually for many days without needing to download fresh broadcast ephemeris from the satellites or from any other source. The orbit data distributed to the GNSS devices may be in the same format as the broadcast ephemeris or may be some other model format that is defined by the GPS device. Herein this orbit data is generally referred to as a satellite tracking model (STM). The loading of the STM into the GNSS receiver can be accomplished in many ways. Using the cradle for a personal digital assistant (PDA), direct connection to a network, or a wireless technology, such as Bluetooth or a cellular network, are a few examples of how the ephemeris data can be transferred to the receiver. The transmission is generally accomplished by broadcasting the LTO (or a model representing all or a portion of the LTO) without knowledge of the specific location of the GNSS receiver. As such, the distribution server does not require the GNSS receiver to send any information through the network to the distribution server.

Since GNSS is a ranging system in and of itself, the data transmitted by the GNSS satellites can be used to determine the range, range-rate and clock offsets to the GNSS satellites from a set of tracking stations. This set of observations generated by the tracking stations 102 is used in the orbit determination process, and in the estimation of the satellite clock characteristics. The set of monitoring stations 102 could be a single station, a public network such as the Continuously Operating Reference System (CORS), or a privately owned and/or operated network.

Figure 2:
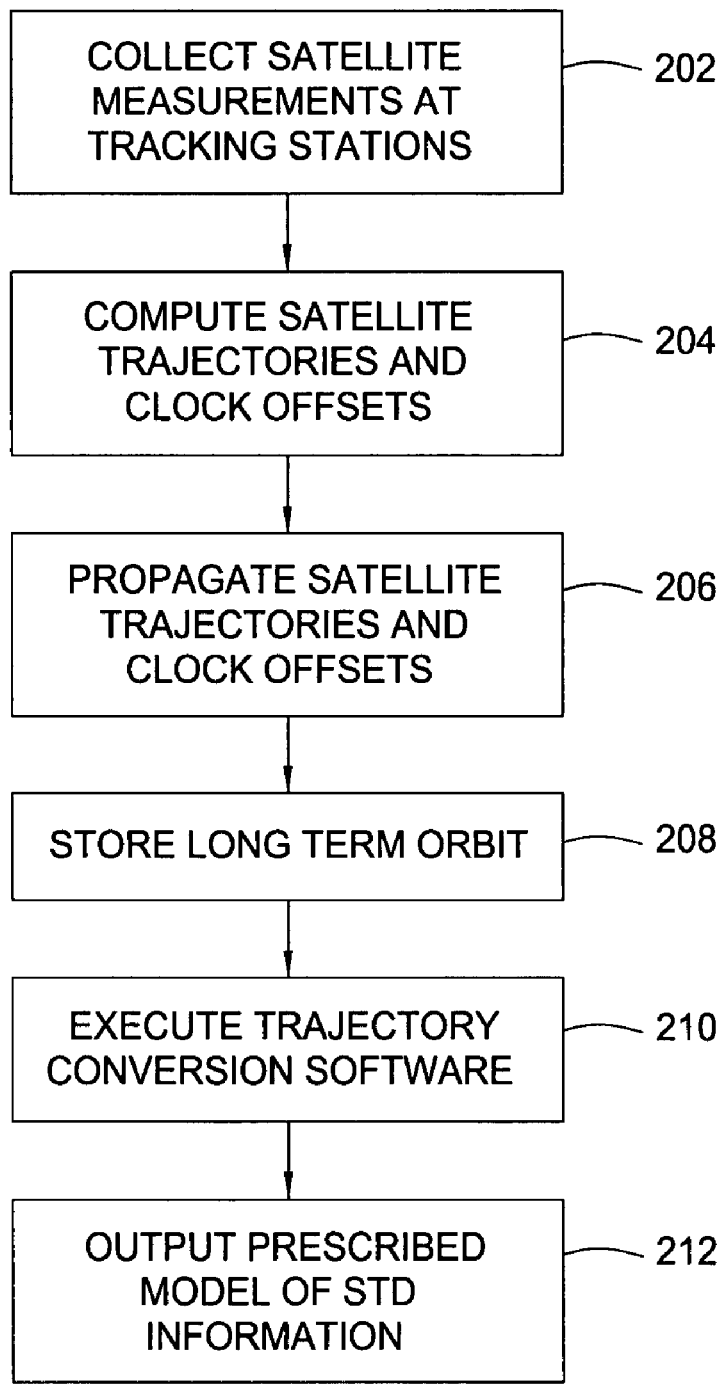
FIG. 2 depicts a method for forming the LTO from the satellite measurements made at satellite tracking stations.

FIG. 2 illustrates the preferred embodiment of a process for computing LTO. The process begins at step 202 with the collection of satellite measurements from the network of tracking stations. Measurements such as code phase, (CP), carrier phase (CPH), and Doppler may be used for GNSS satellite tracking information. At step 204, the measurements are used to compute the satellite trajectories and clock offsets over the periods during which the data was collected. This step is performed using standard GPS processing techniques and software packages well known in the art. Examples of this type of software are GIPSY from the Jet Propulsion Laboratory (JPL), GEODYN from NASA Goddard Space Flight Center (GSFC), and the commercial product, MicroCosm, from Van Martin Systems.

At step 206, the satellite trajectories and clock offsets from step 204 are propagated into the future with the same software package, using standard orbit models, such as gravity, drag, solar radiation pressure, tides, third body effects, precession, nutation, and other conservative and non-conservative forces effecting the satellite trajectory. These are normally the same force models that are used in the estimation of the satellite orbits during the data fit interval. A subset of these models, such as those for drag and solar radiation pressure, are adjusted during the orbit estimation process described in step 204 to best fit the trajectory. This combination of known and estimated force models and parameters is used in the propagation 206 to provide the propagated orbit for time outside the data fit interval. The clock offsets for GPS satellites are typically very small, and change linearly over time. These clock offsets are propagated into the future using standard models, such as a second order model containing clock offset, drift, and drift rate.

At step 208, the propagated satellite trajectories and/or clock offsets are stored as STD in a database. At step 210, the trajectory conversion software converts the LTO data into a model and format expected by the GNSS device to which the model is to be provided. At step 212, the prescribed model or information is output. For use with existing GNSS receivers, the preferred embodiment of the model is the GNSS ephemeris model as described in ICD-GPS-200 and an ephemeris model is generated from the LTO for each 4 hour period as illustrated in the timeline 300 of FIG. 3, i.e., a different model 301, 302 and so on is generated for each six hour period. As such, the plurality of models 301, 302 and so on cumulatively span the length of the available LTO.

In an alternate embodiment, at step 204, the satellite trajectories and clock offsets may be estimated using the data broadcast by the satellites and the standard equations given in ICD-GPS-200c.

The orbit model is a mathematical representation of the satellite trajectory that describes the trajectory as a function of a small number of variables and eliminates the need to provide satellite position vectors explicitly as a table of time vs. satellite positions. An example of an ephemeris model is the classic six element Keplerian orbital model. Although this model lacks long term accuracy, it is a functional ephemeris model for providing satellite trajectory information as a function of a small number of variables. In the preferred embodiment, the model used to describe the trajectory is GNSS standard ephemeris, specified in ICD-GPS-200c, following the same conventions and units. This is the preferred method to provide maximum compatibility with existing GNSS receivers. However, other orbit models could also be used to represent the satellite trajectory. Orbit models can be selected to provide increased accuracy, longer duration fits, more compact representation of the trajectory, or other optimizations required in an application.

This invention is different from the current art in that the orbit model provided to the GNSS device is not the ephemeris data broadcast by the GNSS satellites. Current art downloads the ephemeris broadcast from the GNSS satellites and retransmits that data to GNSS devices. In this invention, the broadcast ephemeris data is not required at any stage and is not used in the preferred implementation.

The broadcast ephemeris data provided by the GNSS satellites, specifically GPS satellites, cover a specific time period (typically 4 hours) and the end of that time the information becomes unusable. For example, if a device receives a broadcast ephemeris that will expire in 5 minutes, the device would need the new broadcast ephemeris before operating outside that 5 minute interval. With this invention, the STD may be formatted for the time period required by the device. This time period may be for the current time forward or may be for some time interval in the future. For example, a device may request orbit information in the standard GPS ephemeris format for the current time. In this case, the ephemeris provided to the device would be valid for the next 6 hours. The device could request orbit information for the next 12 hours in the standard GPS format which could be supplied as two six hour ephemeris orbit models. In addition, different orbit models and formats that support different accuracies and standards can be generated from the LTO.

Fitting the LTO to the desired orbit model can be accomplished in a number of mathematical methods. The preferred embodiment is a least-squares fit of the orbit model parameters to the trajectory data. Other methods, such as Kalman filters or other estimators can also be used to obtain the orbit model parameters that best fit the trajectory data. These techniques of fitting data to orbit models are well known to people skilled in the art of orbit determination and orbit modeling.

Figure 4:
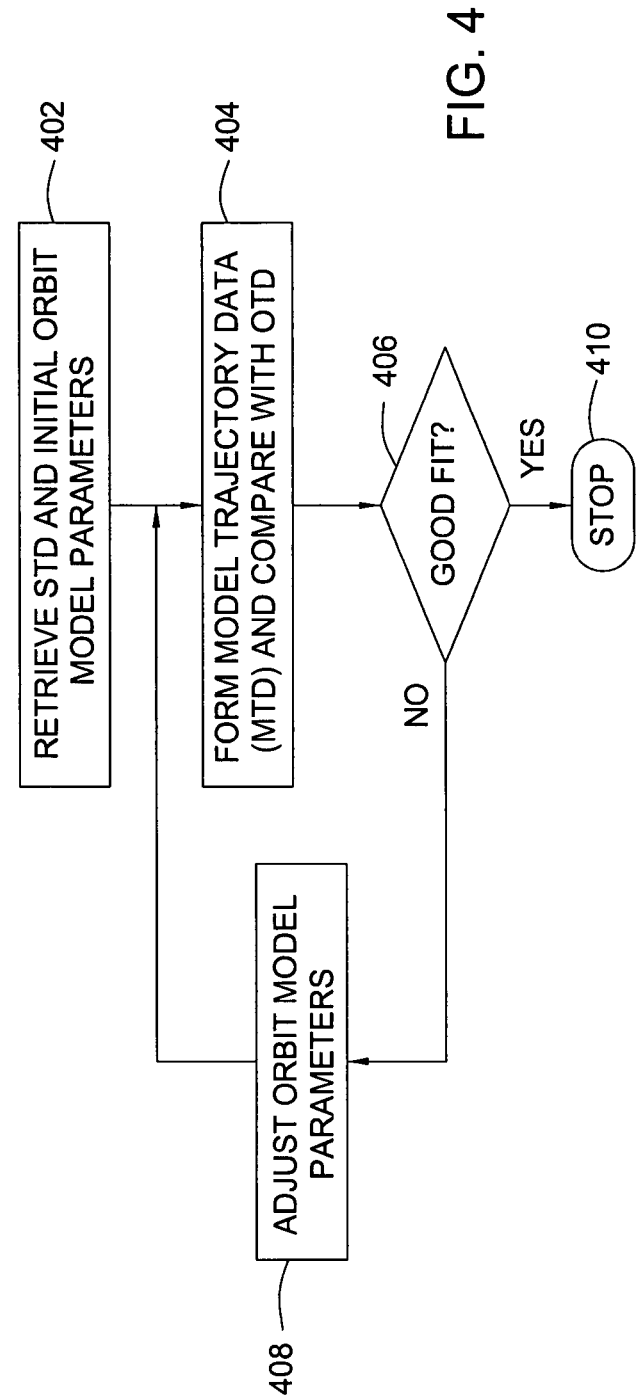
FIG. 4 depicts a flow diagram of a method that uses a least squares estimation technique to update parameters in an orbit trajectory model.

The least squares technique provides an optimal fit of the trajectory data to the orbit model parameters. FIG. 4 depicts a flow diagram of a method of generating an orbit model using a least squares estimation technique. One embodiment of LTO is a table representation of time, position, and clock offset for each satellite, as shown in FIG. 6. The time, position, and clock offset can be in any time/coordinate system. For the purpose of simplicity and illustration, the time/coordinate system is GPS time and Earth-Centered-Earth-Fixed (ECEF) position in the World Geodetic Survey 1984 (WGS-84) reference frame.

At step 402, the STD for the desired time interval is extracted from the STD database. The orbit model parameters are initialized to the orbit model values obtained by a similar process for the previous interval. This guarantees that the initial orbit model parameters are a good fit at least for the beginning of the desired time interval. The rest of the process 400 will ensure that the parameters are adjusted so that they become a good fit for the entire time interval.

In the preferred embodiment there are 15 orbital parameters to be adjusted:
  Square root of semi-major axis (meters^½)
  Eccentricity (dimensionless)
  Amplitude of sine harmonic correction term to the orbit radius (meters)
  Amplitude of cosine harmonic correction term to the orbit radius (meters)
  Mean motion difference from computed value (radians/sec)
  Mean anomaly at reference time (radians)
  Amplitude of cosine harmonic correction term to the argument of latitude (radians)
  Amplitude of sine harmonic correction term to the argument of latitude (radians)
  Amplitude of cosine harmonic correction term to the angle of inclination (radians)
  Amplitude of sine harmonic correction term to the angle of inclination (radians)
  Longitude of ascending node of orbit plane at weekly epoch (radians)
  Inclination angle at reference time (radians)
  Rate of inclination angle (radians/sec)
  Argument of perigee (radians)
  Rate of right ascension (radians/sec)

Although it will be readily apparent that more terms may be used, for better fits, or, fewer terms may be used for a more compact model.

At step 404, the orbit model is used to predict what the trajectory would be, the predicted data is denoted the "Model Trajectory Data" (MTD). If the model were perfect, the MTD would coincide exactly with the STD. At step 406, the MTD and STD are compared to see how closely the orbit model fits the orbit data. In the preferred embodiment, the comparison step 406 is performed by summing the squares of the differences between each trajectory point in the STD and the corresponding point in the MTD, and comparing the resulting sum to a threshold. If the fit is "good", the model parameters are deemed "good" and the process stops at step 410. If the fit is not good then the model parameters are adjusted at step 408. There are many techniques well known in the art for adjusting model parameters to fit data. For example, in FIG. 5, the six-hour ephemeris model was adjusted to fit six hours of STD using a subspace trust region method based on the interior-reflective Newton method described in Coleman, T. F., and Y. Li, "On the convergence of reflective Newton methods for large scale nonlinear minimization subject to bounds", *Mathematical Programming*, Vol. 67, Number 2, pp. 189-224, 1994, and Coleman, T. F., and Y. Li, "An interior, trust region approach for nonlinear minimization subject to bounds", *SIAM Journal on Optimization*, Vol. 6, pp. 418-445, 1996. There are standard computer packages, e.g., MATLAB Optimization Toolbox, that may be used to implement these methods.

Steps 404, 406 and 408 are repeated until the model parameters are found that fit the STD well.

Figure 3:
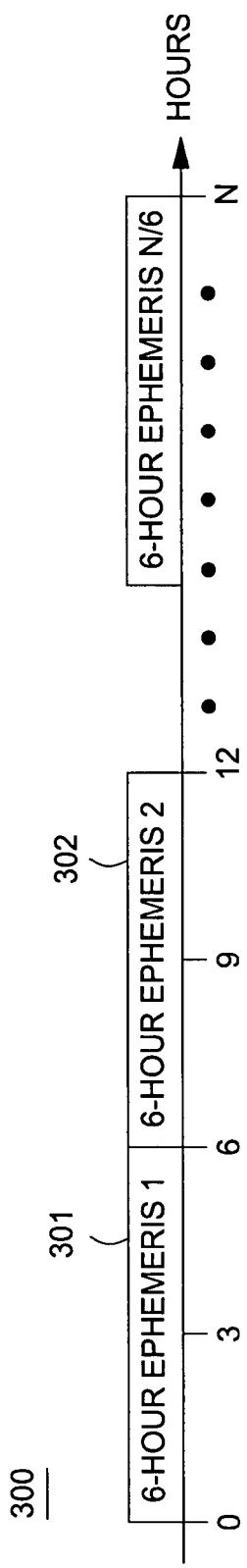
FIG. 3 depicts a timeline of LTO data that conforms to the broadcast ephemeris format models as described in ICD-GPS-200C yet spans many hours.

When fitting an orbit model to trajectory data, there are many choices of which orbit model to choose. The preferred embodiment is to use orbit models with parameters that have been defined in well-known standards. In one embodiment, the ephemeris parameters defined in the GPS interface control document, ICD-GPS-200c, are used. The ICD-GPS-200c definition includes a bit that specifies a 4-hour fit or a 6-hour fit. Typically, the satellite data is broadcast in 4-hour fits and, by the time this data is obtained by the observer of the satellite, the data is often near the end of its fit interval. In one embodiment of the current invention, sequential 6 hour windows of STD are used to create 6-hour ephemeris models, using the technique described in FIG. 4 and the accompanying text. This produces a set of ephemeris models as illustrated in FIG. 3. Although these particular 6-hour models are not available without this invention, the models nonetheless are defined using standard parameters (i.e. ICD-GPS-200c) and will be understood by any device that was designed to be compatible with said standard.

Figure 5:
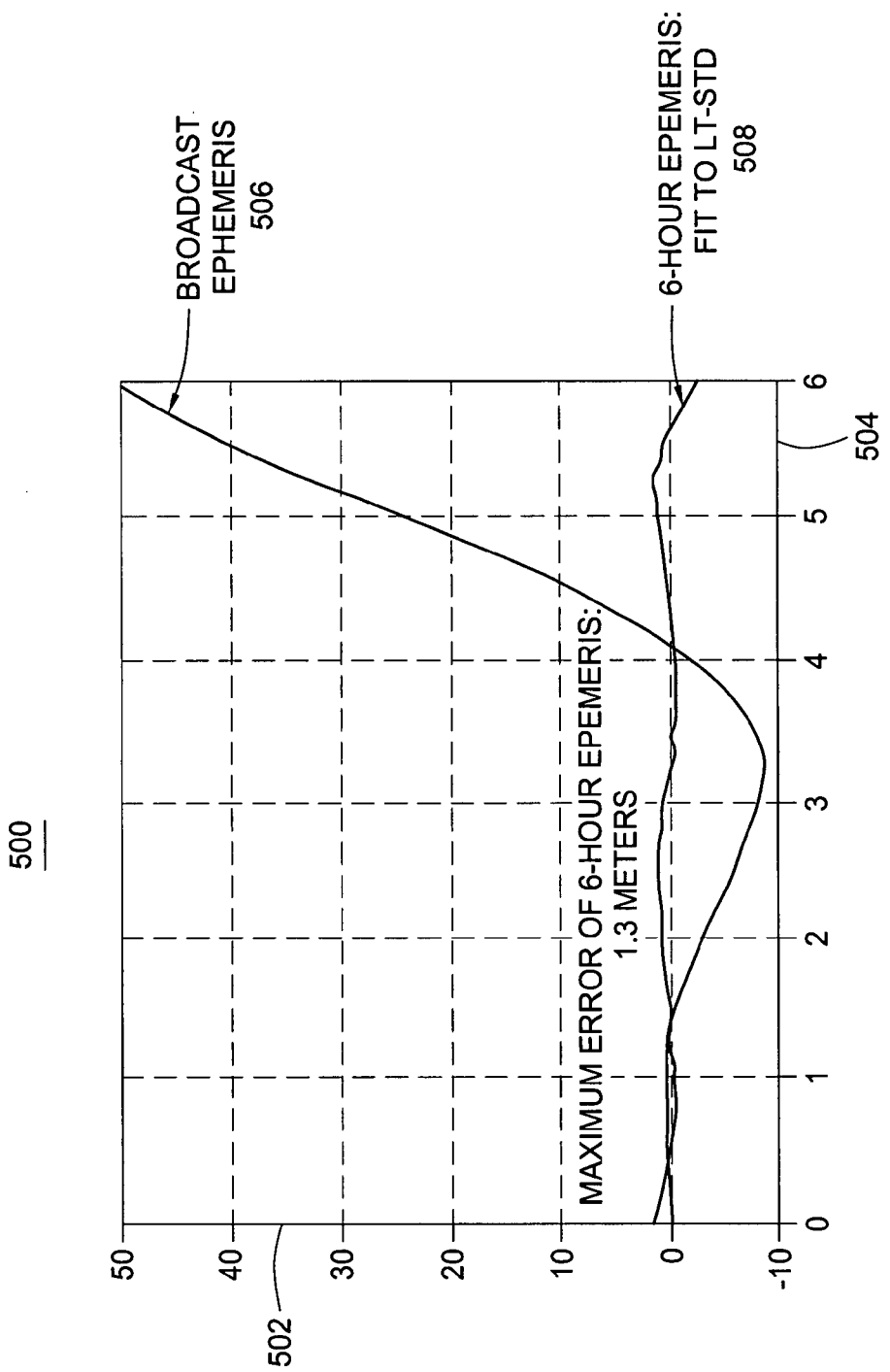
FIG. 5 depicts the error in the orbit model derived from the LTO, and compares the error to the error in the broadcast ephemeris.

FIG. 5 shows an example of Satellite Tracking Data (STD) that was generated for a time interval of greater than six hours. Then, using the technique described by FIG. 4 and accompanying text, parameters of an ICD-GPS-200c ephemeris model were adjusted to give a best fit to 6 hours of the STD. The orbit modeled by this 6-hour ephemeris was then compared to the true trajectory and, for comparison, the true trajectory was also compared to the orbit modeled by the broadcast ephemeris. The results are shown in graph 500 of FIG. 5. The vertical axis 502 represents position error in meters and the horizontal axis 504 represents time in hours. The graph 500 illustrates how the broadcast ephemeris 506 loses validity while the ephemeris 508 created by this invention maintains its validity with approximately one meter of error.

The clock offset of GPS satellites is easily modeled by three parameters. In the preferred embodiment, the measured clock offset is modeled by the three parameters defined in ICD-GPS-200c. These parameters represent clock offset, drift, and drift rate. The parameters are adjusted in a similar way to the method 400 described above to give a model that best fits the measured data over the time interval.

Alternative embodiments may use longer fit intervals, such as 8, 14, 26, 50, 74, 98, 122, or 146 hours for each ephemeris model. These fit intervals are envisaged in ICD-GPS-200c, but are seldom, if ever, available from the broadcast ephemeris. Under the current invention, models with these fit intervals may be generated even when the broadcast ephemeris is limited to a 4-hour fit interval.

Alternative embodiments of the STD data may include observed satellite velocity, acceleration, clock drift, or clock drift rate and these terms may be used in the process of fitting a model in ways which are well known in the art.

Another embodiment of an orbit model uses the spare data bits in the current ephemeris format of a conventional GPS signal to provide additional model parameters that would improve the data fit over long time intervals. For example, subframe 1 has 87 spare bits that are available for additional parameters. This technique allows for more parameters to describe the orbital motion of the satellites without compromising the standard data format. This new ephemeris model is based on the current ephemeris model with additional correction terms used to augment the model to support the longer fit intervals with greater accuracy.

Yet another embodiment of an orbit model is to develop a new set of orbital parameters that describe the satellite orbit which are different, in part or in their entirety, from the GPS ephemeris model parameters. With the goal of making the fit interval longer, different parameters may provide a better description of the satellite orbit. This new set of parameters could be defined such that they would fit into the existing data structures, however, their implementation and algorithms for use would be different.

Still a further embodiment of an orbit model would be to develop a new set of orbital parameters that would not fit into the existing GPS ephemeris model format. This new set of parameters would be developed to better address the trade-off between the number of parameters required, the fit interval, and the orbit accuracy resulting from the model. An example of this type of ephemeris parameter set is Brouwer's theory that could be used as is or modified to account for GPS specific terms. Brouwer's theory as described in Brouwer, D. "Solution of the Problem of Artificial Satellite Theory without Drag", Astron J. 64: 378-397, November 1959 is limited to satellites in nearly circular orbits such as GPS satellites.

Another embodiment is to use a subset of the standard ephemeris parameters defined in ICD-GPS-200c. This approach is particularly useful when bandwidth and/or packet size is limited in the communication link that will be used to convey the orbit model to the Remote GPS Receiver. In one such embodiment, the fifteen orbit parameters described above, and in ICD-GPS-200c, may be reduced to a subset of 9 parameters, by setting all harmonic terms in the model to zero:

Square root of semi-major axis (meters^½)
Eccentricity (dimensionless)
Mean motion difference from computed value (radians/sec)
Mean anomaly at reference time (radians)
Longitude of ascending node of orbit plane at weekly epoch (radians)
Inclination angle at reference time (radians)
Rate of inclination angle (radians/sec)
Argument of perigee (radians)
Rate of right ascension (radians/sec)

Process 400 is then executed using this subset of parameters. This reduces the amount of data that must be sent to the Remote GPS Receiver. The receiver can then reconstruct a standard ephemeris model by setting the "missing" harmonic terms to zero. There are a large number of alternative embodiments to reduce the size of the data, while still providing a model that fits the STD, including:

Removing parameters from the model, and replacing them with a constant, such as zero—as done above—or some other predetermined value, which is either stored in the Remote GPS Receiver, or occasionally sent to the receiver.

The resolution of the parameters may be restricted in the process 400, this too reduces the amount of data that must be sent to the mobile GPS receiver.

Parameters, which are similar among two or more satellites, may be represented as a master value plus a delta, where the delta requires fewer bits to encode; an example of this is the parameter Eccentricity, which changes very little among different GPS satellites.

Some of these approaches reduce the ability of the model to fit the data over a period of time (e.g., six hours). In this case, the fit interval may be reduced (e.g. to four hours) to compensate.

Each satellite in the plurality of GNSS satellites has an associated LTO. Together all the LTOs for a plurality of satellites form an LTO set. The present invention compresses the LTO set by reducing information redundancy from the set. The LTO set becomes a compressed set comprising an ephemeris structure (denoted lto_0) plus a sequence of "deltas" to the ephemeris structure. To decompress the compressed set, client software in the GNSS receiver extracts the ephemeris structure of the lto_0 and adds a corresponding delta to lto_0 to form each LTO in the set.

Figure 7:
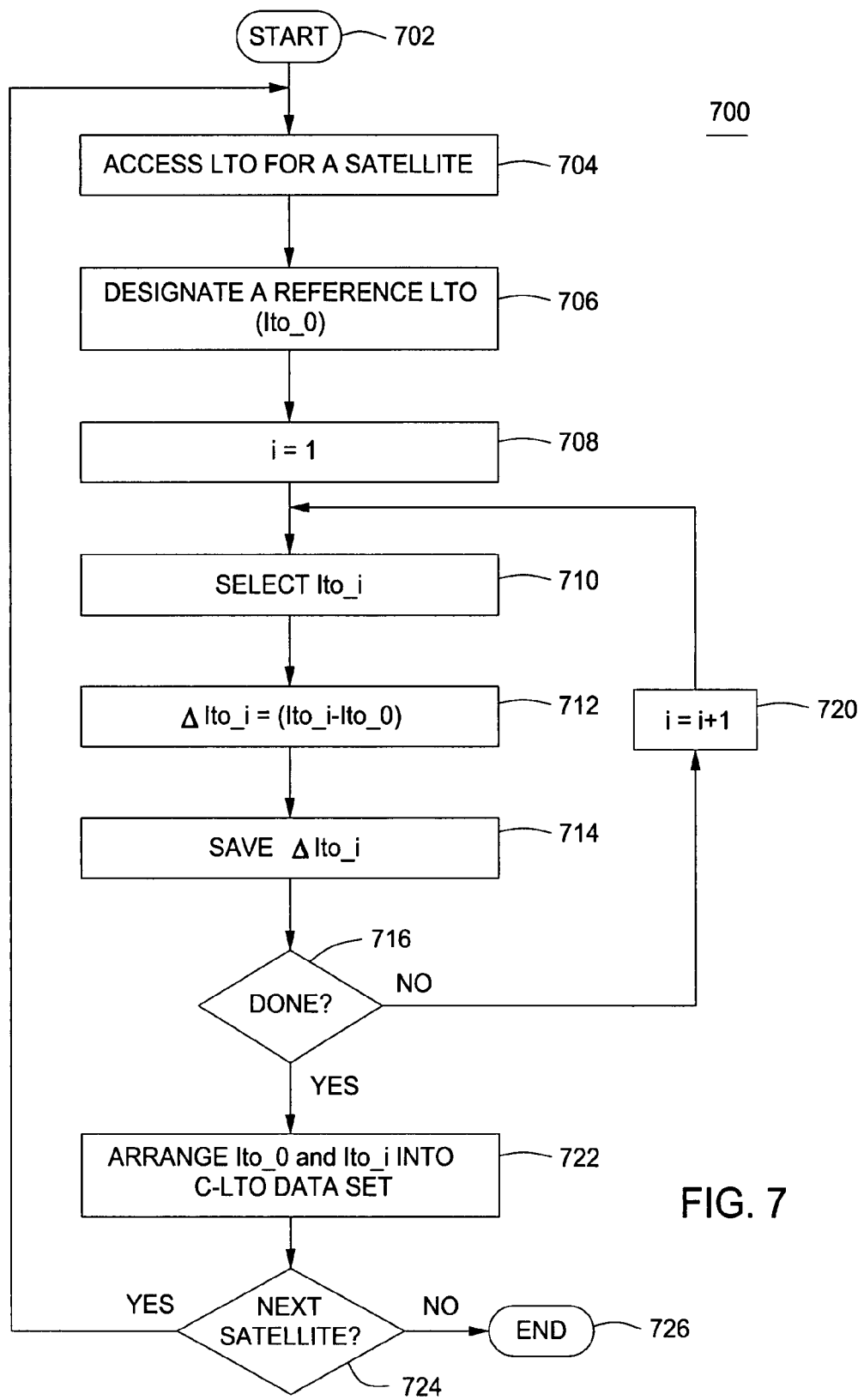
FIG. 7 depicts a flow diagram depicting a method of compressing a set of LTO in accordance with one embodiment of the invention.

FIG. 7 depicts a flow diagram of one embodiment of a compression method 700. The method 700 begins at step 702 and proceeds to step 704, where the method 700 being executed by the server (106 of FIG. 1) accesses a set of LTO. Method 700 applies to each satellite separately. At step 706, the method 700 designates one LTO as a reference LTO (lto_0). In the one embodiment, lto_0 is the first LTO in the set of LTO for this particular satellite. In alternative embodiments, lto_0 could be any LTO in the set of LTO, or it could be another structure with the same fields, such as the current satellite ephemeris, or almanac, In another alternative embodiment lto_0 could derived by using information from the set of LTO, (such as forming lto_0 from the average LTO, the median LTO, or some other derived LTO). In yet another alternative embodiment lto_0 could be arbitrarily assigned. At step 708, variable "i" is set to 1 and, at step 710, the method selects the next LTO (lto_i). The difference (Δlto_i) on a field-by-field basis between the reference LTO (lto_0) and the current selected LTO (lto_i) is computed at step 712. As such, fields that do not change from LTO to LTO have a value of zero to indicate no change. In this manner, the LTO of each satellite is compressed.

At step 714, the Δlto_i is saved. At step 716, the method 700 queries whether the method 700 has completed compressing all the satellite LTOs. If the query is negatively answered, the method 700 proceeds to step 720, where "i" is increased by 1 to enable step 710 to select the next LTO for compression.

If the method 700 has completed the compression process for all LTOs, then the method continues with step 722. At step 722, the method 700 arranges lto_0 and the Δlto_i values into a data set. The method 700 also creates an overhead record—a dynamic range map—that is added to the compressed data set. The dynamic range map contains a dynamic range value (the number of bits) for each field in an LTO. For example, if a field contains no change, then the field in that Δlto_i is assigned a dynamic range of zero and no information needs to be included in that particular field in the Δltoi. Once the compressed data set is complete, the method 700 ends at step 724. It is understood that the data set could be implemented in different ways, for example: as a file, or a series of communications packets, or some other means of transferring the information.

Figure 8:
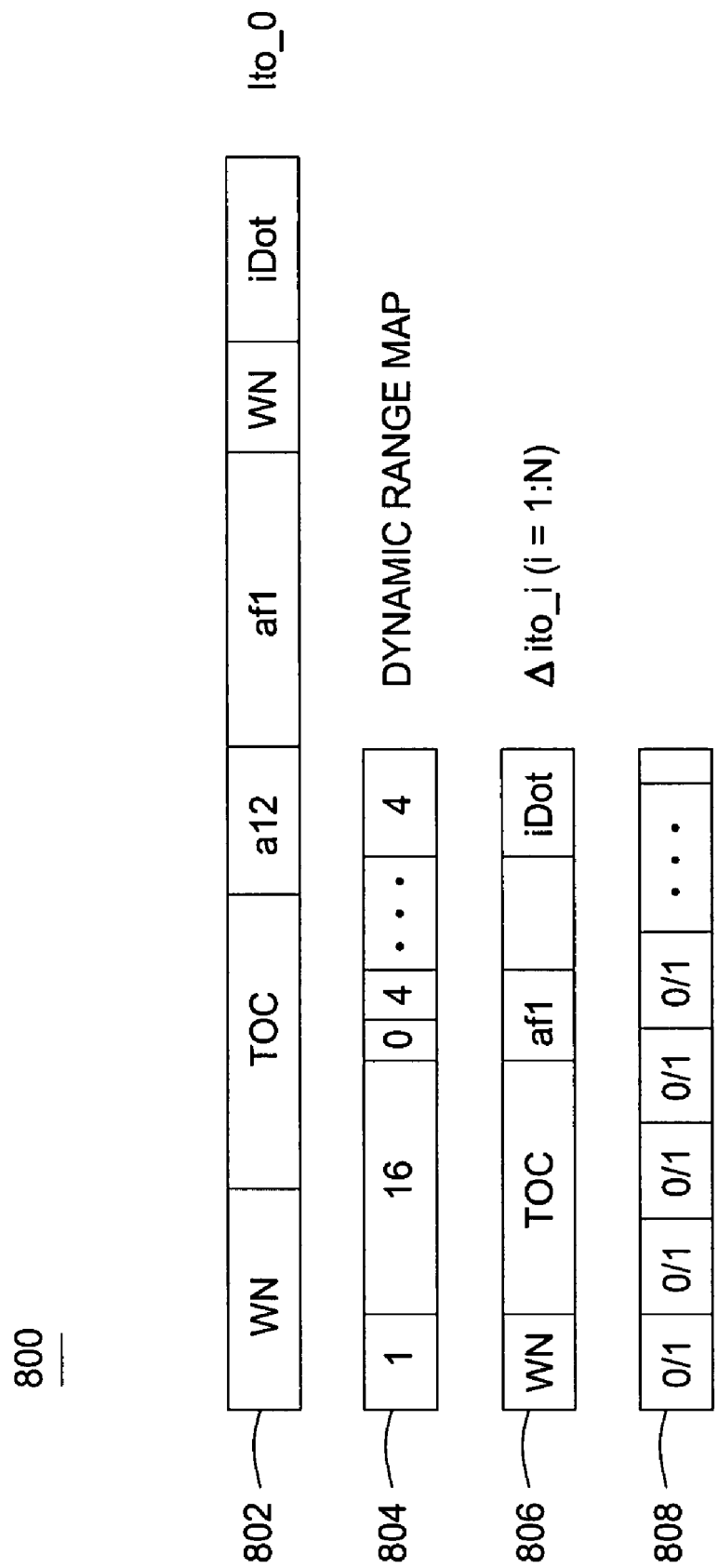
FIG. 8 depicts a graphical illustration of an LTO compression data set in accordance with one embodiment of the invention.

FIG. 8 depicts a graphical illustration of a compressed data set 800 comprising an uncompressed reference LTO (lto_0) 802, and a series of delta LTOs (Δlto_i) 806. In various alternative embodiments, at least one of a dynamic range map 804 and a bitmask 808 may also form a portion of the C-LTO data set 800. Note that since TOC (16 bits) changes with every LTO, it is identified in the dynamic range map as having a range of 16 bits and all 16 bits of TOC information appear in the Δlto_i. However the af2 field does not change and has a range of zero and therefore does not appear at all in the Δlto_i. Such compression to reduce redundancy is performed on all the fields. Once complete, the compressed data set can be distributed to the GNSS receiver.

In an alternative embodiment of that shown in FIG. 8, the dynamic range map 804 is provided in advance or agreed upon in a specification. In this case, there is no need to include the dynamic range map 804 as part of the LTO data being distributed because it is known. As such, the number of bits of each delta LTO field is fixed. This technique has the advantage of simplicity and ease of encoding in a specification but it is less efficient because it has to use more bits per delta field to cover all possible variations of each parameter in the LTO data. Using this technique raises the risk that an instance occurs where one or more of the fields of the LTO deltas falls outside the fixed dynamic range that has been specified or agreed upon. A further refinement of this technique uses a bitmask 808 with one bit for each field indicating whether the compressed format has been used for each particular field. This technique provides a fallback mechanism for the case where one or more parameters exceed the specified dynamic range.

Each of the parameters of the LTO has an associated scale factor. For example, if the LTO comprises standard ephemeris parameters, one such parameter is $i_0$ (orbit inclination angle) which has units of semi-circles and a scale factor of $2^{-31}$. In an alternative embodiment, the scale factors could be changed so that fewer bits are used to carry the information.

In an alternative embodiment, certain terms may be eliminated from the set of delta-LTOs, and reconstructed. For example, the four terms: $M_0$, $i_0$, $\Omega_0$, and af0 do not have to be sent more than once per satellite per LTO, since, for each subsequent 6 hour segment, these terms can be reconstructed from the previously distributed values.

$M_0$=Mean anomaly, the angular distance along the orbital plane at which the satellite is found at toe.

$i_0$=Orbital inclination, the angle of the orbital plane to the equator $\Omega_0$=Right ascension at weekly epoch, the longitude of the intersection of the orbital plane with the equator, at the start of the week.

af0=clock offset

Each of these terms can be computed from previous values as follows.

Given a set of orbit parameters defined at some reference time toe=toc, the values of $\Omega_0$, af0, $M_0$ and $i_0$ can be computed for some other reference time (toe+dt) as follows:

$$\Omega_0 = \Omega_0 + \Omega\_dot * dt;$$

$$af0 = af0 + af1*dt + \tfrac{1}{2}af2*dt^2$$

$$M_0 = M_0 + dt * \sqrt{(\mu/(a^3))}$$

$$i_0 = i_0 + iDot * dt$$

where:

$\mu$=3.986005e$^{14}$; % WGS-84 Universal gravitational parameter (m³/s²)

We=7.2921151467e-5; % WGS-84 Earth Rotation Rate (rad/sec)

a=semi-major axis of the orbit af1=clock rate, af2=clock acceleration
and the new values are defined with respect to the other time t=toe+dt To recover $\Omega_0$, af0, $M_0$ and $i_0$ at n 6 hour epochs after toe, the method propagates forward n times using the above equations, and computes the appropriate values on the right hand side of the equations at each step.

Figure 9:
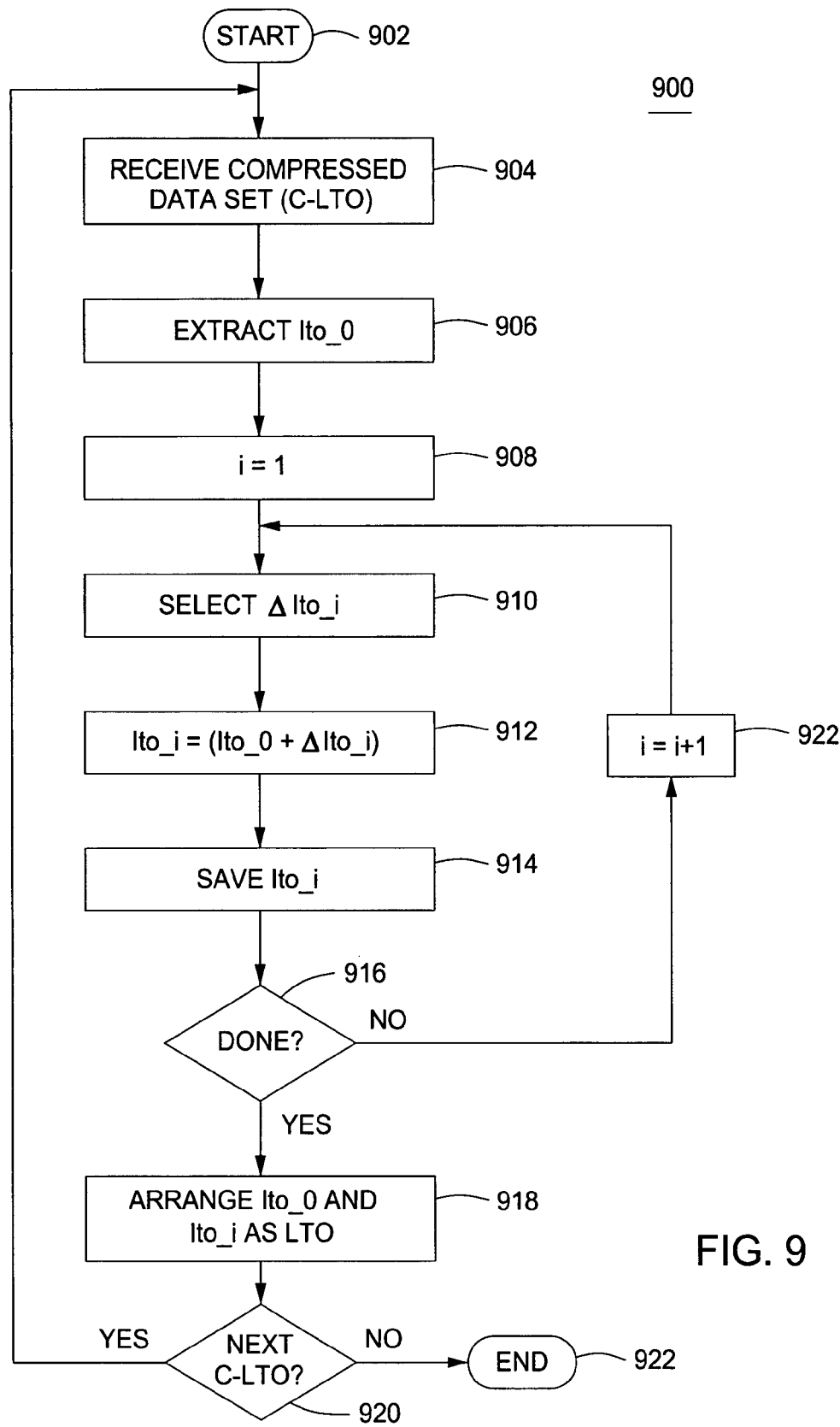
FIG. 9 depicts a flow diagram of a method of decompressing a compressed LTO data set in accordance with one embodiment of the invention.

FIG. 9 depicts a flow diagram of a method 900 that is performed by the GNSS receiver to unpack the compressed data set and recreate LTO. The method 900 starts at step 902 and proceeds to step 904, wherein the compressed data set is received as described above with respect to a uncompressed LTO. At step 906, the reference LTO (lto_0) is extracted from the data set and, at step 908, the variable "i" is set to 1. At step 910, the method 900 selects a Δlto_i and, at step 912, adds lto_0 to Δlto_i on a field by field basis. The dynamic range map is used to identify where the data is located within Δlto_i. At step 914, the value of lto_i is saved in memory.

At step 916, the method 900 queries whether all the Δlto_i have been processed. If the query is negatively answered, the method 900 proceeds to step 922 to increase i by 1 and return to step 910 to select the next Δlto_i for decompression. If, at step 916, the decompression method 900 has processed all Δlto_i, then the method 900 continues to step 918. At step 918, the method 900 arranges the stored LTO values (lto_0 and all lto_i) into an LTO set that is then used by the GNSS receiver in the manner described above with respect to uncompressed LTO.

While the foregoing is directed to the preferred embodiment of the present invention, other and further embodiments of the invention may be devised without departing from the basic scope thereof, and the scope thereof is determined by the claims that follow.

The invention claimed is:

1. A method for processing long term orbit data comprising:
    receiving long term orbit data at a server;
    reducing redundant information from the long term orbit data to form compressed long term orbit data; and
    omitting terms from the long term orbit data when said terms can be reconstructed from the remaining data.

2. The method of claim 1 wherein said long term orbit data comprises: long term orbit data for each satellite of a plurality of satellites forming a set of long term orbit data.

3. The method of claim 1 wherein the removing step further comprises:
    identifying a first long term orbit data for at least one satellite as a reference data for said at least one satellite
    subtracting a second long term orbit data from the reference data to form a delta data, for said at least one satellite.

4. The method of claim 3 wherein the first long term satellite orbit data is selected from the set of long term satellite orbit data.

5. The method of claim 3 wherein the first long term satellite orbit data is derived by using information from the set of long term satellite orbit data.

6. The method of claim 3 wherein the first long term satellite orbit data is arbitrary.

7. The method of claim 3 further comprising forming a compressed data set comprising the reference data and the delta data.

8. The method of claim 7 wherein the compressed data set further comprises a dynamic range map.

9. The method of claim 7 wherein the compressed data set further comprises an indicator of whether a field is compressed.

10. The method of claim 7 wherein the compressed data set comprises scale factors of the delta data.

11. The method of claim 1, further comprising:
    generating satellite orbit data for a past period of time; and
    extending the satellite orbit data into the future.

12. The method of claim 1, further comprising:
    generating satellite clock offset data for a past period of time; and
    extending the satellite clock offset data into the future.

13. The method of claim 1 further comprising: transmitting the compressed long term bit data to a global navigation satellite system (GNSS) receiver using a wireless communications link.

14. The method of claim 1, wherein reducing redundant information further comprises removing duplicative information.

15. A method for processing long term orbit data comprising: receiving long term orbit data at a server; creating a reference long term orbit data; and creating at least one delta long term orbit data representing differences between the reference long term orbit data and other long term orbit data.

16. The method of claim 15 wherein the reference long term orbit data is actual long term orbit data selected from a set of long term orbit data or arbitrary long term orbit data.

17. The method of claim 15 wherein the creating a plurality of delta long term orbit data further comprises: computing a difference between at least one term of one of the other long term orbit data and at least one term of the reference long term orbit data.

18. The method of claim 15 further comprising: generating a dynamic range map for the delta long term orbit data.

19. The method of claim 15 further comprising: generating a bitmask that indicates whether a term of the other long term orbit data is compressed.

20. The method of claim 15 further comprising omitting terms from the delta long term orbit data when said terms can be reconstructed from the remaining data.

21. The method of claim 15 further comprising: arranging the reference long term orbit data and the delta long term orbit data to form a compressed data set.

22. The method of claim 15 further comprising: reconstructing a set of long term orbit data using the reference long term orbit data and the delta long term orbit data.

23. The method of claim 22 wherein the reconstructing step further comprises: adding a delta term to a reference term.

24. The method of claim 22 wherein the reconstructing step further comprises: using a rate term.

25. The method of claim 24 wherein said rate term is multiplied by a time difference.

26. Apparatus for processing long term orbit data comprising:
    a server, said server operable to:
        receive long term orbit data; and
        reduce redundant information from the long term orbit data to form compressed long term orbit data, wherein reducing redundant information further comprises removing duplicative information.

27. A method for processing long term orbit data comprising:
    receiving long term orbit data at a server;
    reducing redundant information from the long term orbit data to form compressed long term orbit data; and
    wherein said long term orbit data comprises:
    long term orbit data for each satellite of a plurality of satellites forming a set of long term orbit data.

28. The method of claim 27 further comprising generating satellite orbit data for a past period of time; and extending the satellite orbit data into the future.

29. The method of claim 27 wherein said producing step further comprises: generating satellite clock offset data for a past period of time; and extending the satellite clock offset data into the future.

30. The method of claim 27 further comprising:
transmitting the compressed long term bit data to a global navigation satellite system (GNSS) receiver using a wireless communications link.

31. The method of claim 27, wherein reducing redundant information further comprises removing duplicative information.

32. A method for processing long term orbit data comprising:
receiving long term orbit data at a server;
reducing redundant information from the long term orbit data to form compressed long term orbit data; and
generating satellite orbit data for a past period of time; and extending the satellite orbit data into the future.

33. The method of claim 32 wherein said producing step further comprises: generating satellite clock offset data for a past period of time; and extending the satellite clock offset data into the future.

34. The method of claim 32 further comprising:
transmitting the compressed long term bit data to a global navigation satellite system (GNSS) receiver using a wireless communications link.

35. The method of claim 32, wherein reducing redundant information further comprises removing duplicative information.

36. A method for processing long term orbit data comprising:
receiving long term orbit data at a server;
reducing redundant information from the long term orbit data to form compressed long term orbit data; and
transmitting the compressed long term bit data to a global navigation satellite system (GNSS) receiver using a wireless communications link.

37. The method of claim 36, wherein reducing redundant information further comprises removing duplicative information.

38. A method for processing long term orbit data comprising:
receiving long term orbit data at a server;
reducing redundant information from the long term orbit data to form compressed long term orbit data, wherein reducing redundant information further comprises removing duplicative information.

* * * * *